(12) United States Patent
Vasko et al.

(10) Patent No.: US 11,407,181 B2
(45) Date of Patent: Aug. 9, 2022

(54) SERVO-DRIVEN ULTRASONIC WELDING SYSTEM AND METHOD FOR WELDING TO A THIN PART WITHOUT READ-THROUGH

(71) Applicant: Dukane IAS, LLC, St. Charles, IL (US)

(72) Inventors: Petr Vasko, Velke Prilepy (CZ); Jiri Vizek, Jicin (CZ); Arnošt Benda, Velké Přílepy (CZ); Leo Klinstein, Glenview, IL (US)

(73) Assignee: Dukane IAS, LLC, St. Charles, IL (US)

( * ) Notice: Subject to any disclaimer, the term of this patent is extended or adjusted under 35 U.S.C. 154(b) by 0 days.

(21) Appl. No.: 16/897,962

(22) Filed: Jun. 10, 2020

(65) Prior Publication Data

US 2021/0187866 A1 Jun. 24, 2021

Related U.S. Application Data

(63) Continuation of application No. 16/723,396, filed on Dec. 20, 2019, now Pat. No. 10,710,311.

(51) Int. Cl.
*B29C 65/08* (2006.01)
*B29C 65/00* (2006.01)

(52) U.S. Cl.
CPC ............ *B29C 65/08* (2013.01); *B29C 66/348* (2013.01); *B29C 66/43* (2013.01); *B29C 66/73921* (2013.01)

(58) Field of Classification Search
CPC ................. B29C 65/08; B29L 2031/30; B29L 2031/3044

(Continued)

(56) References Cited

U.S. PATENT DOCUMENTS

| 4,534,818 A | 8/1985 | Kreager |
| 4,767,492 A | 8/1988 | Fukusima |

(Continued)

FOREIGN PATENT DOCUMENTS

| DE | 20 2017 104190 U1 | 10/2018 |
| EP | 1 512 518 A1 | 3/2005 |
| EP | 1 867 462 A2 | 12/2007 |

OTHER PUBLICATIONS

International Search Report and Written Opinion in International Application No. PCT/US2020/065444, datd Mar. 15, 2021 (16 pages).

(Continued)

*Primary Examiner* — James D Sells
(74) *Attorney, Agent, or Firm* — Nixon Peabody LLP

(57) ABSTRACT

An ultrasonic welding method for joining a first thermoplastic part and a second thermoplastic part without causing visible read-through on an exposed surface of the second part. The method includes arranging the first part on an inner surface of the second part. The inner surface is opposite the exposed surface. The first part has an interface portion contacting the inner surface. The method includes causing a horn of an ultrasonic welding stack to be pressed against the first part by applying ultrasonic energy oscillating at a frequency in a range of 45-70 kHz through the horn, to thereby join the first part and the second part together. The horn has at least one protruding distal portion configured to penetrate through the first part as the ultrasonic energy is imparted through the horn. The distal portion has a length longer than a thickness of the first part. A collapse distance of a weld formed at the interface portion is less than the thickness of the first part, to avoid read-through effects on the exposed surface of the second part.

12 Claims, 5 Drawing Sheets

(58) Field of Classification Search
USPC .......................................................... 293/120
See application file for complete search history.

(56) References Cited

U.S. PATENT DOCUMENTS

| | | | |
|---|---|---|---|
| 8,985,650 B2 * | 3/2015 | Birka | ................... B29C 66/131 |
| | | | 293/120 |
| 9,272,466 B2 | 3/2016 | Hull | |
| 10,710,311 B1 | 7/2020 | Vasko | |
| 2014/0367018 A1 | 12/2014 | Klinstein | |

OTHER PUBLICATIONS

Extended European Search Report in European Patent Application No. EP 20174237.6 dated Sep. 14, 2020 (10 pages).

* cited by examiner

SERVO-DRIVEN ULTRASONIC WELDING SYSTEM AND METHOD FOR WELDING TO A THIN PART WITHOUT READ-THROUGH

CROSS-REFERENCE TO RELATED APPLICATIONS

This application is a continuation of U.S. patent application Ser. No. 16/723,396, filed Dec. 20, 2019, now allowed, which is incorporated herein by reference in its entirety.

BACKGROUND OF THE INVENTION

Ultrasonic transducers are devices that convert energy into sound, typically in the nature of ultrasonic vibrations—sound waves that have a frequency above the normal range of human hearing. One of the most common types of ultrasonic transducers in modern use is the piezoelectric ultrasonic transducer which converts electric signals into mechanical vibrations. Piezoelectric materials are materials, traditionally crystalline structures and ceramics, which produce a voltage in response to the application of a mechanical stress. Since this effect also applies in the reverse, a voltage applied across a sample piezoelectric material will produce a mechanical stress within the sample. Suitably designed structures made from these materials can therefore be made that bend, expand, or contract when a current is applied thereto.

Many ultrasonic transducers are tuned structures that contain piezoelectric ("piezo") ceramic rings. The piezo ceramic rings are typically made of a material, such as lead zirconium titanate ceramic (more commonly referred to as "PZT"), which have a proportional relationship between their applied voltage and mechanical strain (e.g., thickness) of the rings. The supplied electrical signal is typically provided at a frequency that matches the resonant frequency of the ultrasonic transducer. In reaction to this electrical signal, the piezo ceramic rings expand and contract to produce large-amplitude vibrational motion. For example, a 20 kHz ultrasonic transducer typically produces 20 microns of vibrational peak-to-peak (p-p) amplitude. The electrical signals are often provided as a sine wave by a power supply that regulates the signal so as to produce consistent amplitude mechanical vibrations and protect the mechanical structure against excessive strain or abrupt changes in amplitude or frequency.

Typically, the ultrasonic transducer is connected to an ultrasonic booster and a sonotrode (also commonly called a "horn" in the ultrasonic welding industry), both of which are normally tuned to have a resonant frequency that matches that of the ultrasonic transducer. The ultrasonic booster, which is structured to permit mounting of the ultrasonic transducer assembly (or "stack" as it is commonly called), is typically a tuned half-wave component that is configured to increase or decrease the vibrational amplitude passed between the converter (transducer) and sonotrode (horn). The amount of increase or decrease in amplitude is referred to as "gain." The horn, which is oftentimes a tapering metal bar, is structured to augment the oscillation displacement amplitude provided by the ultrasonic transducer and thereby increase or decrease the ultrasonic vibration and distribute it across a desired work area.

Typically, all of the mechanical components used in an ultrasonic transducer assembly must be structured so that they operate at a single resonant frequency that is near or at a desired operating frequency. In addition, the ultrasonic transducer assembly must often operate with a vibrational motion that is parallel to the primary axis (i.e., the central longitudinal axis) of the assembly. The power supply for the stack generally operates as part of a closed-loop feedback system that monitors and regulates the applied voltage and frequency.

For certain applications, particularly those involving welding of thermoplastic parts together, ultrasonic welding technology is highly desirable due to its consistency (particularly when the stack's movement is controlled by a servo-driven motor), speed, weld quality, and other advantages. However, a phenomenon known as "read-through" can occur particularly when one of the parts is thin. Read-through in this context is a visual artifact that can be produced during the welding of one side of a thin part, which is visible by the naked eye from the opposite side of the thin part. For applications where the thin part is a highly visible feature of a manufactured system, read-through is highly undesirable. This is especially the case when the thin part is painted or has a high-gloss finish, when visible artifacts in the form of read-through become especially pronounced. The welding process disturbs the original unblemished state of the thin part in the form of bumps, wavy artifacts, and other perturbations in the exposed surface of the thin part, which are even more pronounced when the thin part has a large, smooth surface.

It has been observed that read-through occurs when the thickness of the area to be welded to another part is 2.8 mm or less and the frequency of the ultrasonic energy applied to the part is 40 kHz or less. Welds produced by these methods produce undesirable read-through on the finished surface of the thin part to which the part is welded. As the thickness of the thin part decreases, the read-through effect becomes increasingly pronounced and unacceptable.

A need exists, therefore, for a solution to this read-through problem. Aspects of the present disclosure are directed to fulfilling this need by eliminating read-through, among other objectives.

SUMMARY OF THE INVENTION

According to an aspect of the present disclosure, an ultrasonic welding method is disclosed for joining a first thermoplastic part and a second thermoplastic part without causing visible read-through on an exposed surface of the second part. The method includes: arranging the first part on an inner surface of the second part, the inner surface being opposite the exposed surface, the first part having an interface portion contacting the inner surface; causing a horn of an ultrasonic welding stack to be pressed against the first part by applying ultrasonic energy oscillating at a frequency in a range of 45-70 kHz through the horn, to thereby join the first part and the second part together, the horn having at least one protruding distal portion configured to penetrate through the first part as the ultrasonic energy is imparted through the horn, the at least one protruding distal portion having a length longer than a thickness of the first part, wherein a collapse distance of a weld formed at the interface portion is less than the thickness of the first part, to avoid read-through effects on the exposed surface of the second part.

The causing the horn to be pressed against the first part can include moving the horn toward the second part at a rate of at least 12 millimeters per second. The ultrasonic energy can have an amplitude of at least 50 micrometers peak-to-peak. The frequency can be 50 kHz. The second part can have a thickness that does not exceed 2.6 millimeters and the exposed surface can be painted. The length of the distal portion can be 20% longer than the thickness of the first part.

The method can further include causing the horn to be retracted from the first part before the at least one protruding distal portion fully penetrates through the thickness of the first part and ceasing application of the ultrasonic energy. The at least one protruding distal portion can be a plurality of protruding distal portions, each having the same length. Movement of the horn can be controlled by a servo-driven actuator to ensure that the collapse distance does not exceed the thickness of the first part. The at least one protruding distal portion can have, at an end thereof, a square cross-section, or a round cross-section, or an annular cross-section.

According to another aspect of the present disclosure, an ultrasonic welding method is disclosed for joining a first thermoplastic part and a second thermoplastic part without causing visible read-through on an exposed surface of the second part. The method includes: arranging the first part on an inner surface of the second part, the inner surface being opposite the exposed surface, the first part having an interface portion contacting the inner surface; responsive to the arranging, moving a horn of an ultrasonic welding stack by a servo-driven motor at a speed of at least 10 millimeters per second while applying ultrasonic energy oscillating at a frequency of 50 kHz through the horn and having an amplitude of at least 50 micrometers peak-to-peak, to thereby join the first part and the second part together, the horn having at least one protruding distal portion configured to penetrate through the first part as the ultrasonic energy is imparted through the horn, the at least one protruding distal portion having a length longer than a thickness of the first part, wherein a collapse distance of a weld formed at the interface portion is less than the thickness of the first part; stopping movement of the horn before the at least one protruding portion has fully penetrated through the thickness of the first part; responsive to the stopping, retracting the horn from the first part before the at least one protruding distal portion fully penetrates through the thickness of the first part; and ceasing application of the ultrasonic energy to produce the first part joined to the second part without any visible read-through effects on the exposed surface of the second part.

According to a further aspect of the present disclosure, an ultrasonic welding system is disclosed for joining a first thermoplastic part and a second thermoplastic part without causing visible read-through on an exposed surface of the second part. The system includes: an ultrasonic welding stack including a horn arranged to press a first part to be joined with an inner surface of a second part, the inner surface being opposite the exposed surface, the first part having an interface portion contacting the inner surface, the horn having at least one protruding distal portion; one or more controllers operatively coupled to the ultrasonic welding stack; a servo-driven actuator coupled to the horn to advance and retract the horn under control of the one or more controllers; the one or more controllers operatively coupled to the ultrasonic welding stack and configured to: causing the horn to be pressed against the first part by applying ultrasonic energy oscillating at a frequency in a range of 45-70 kHz through the horn, to thereby join the first part and the second part together, the at least one protruding distal portion configured to penetrate through the first part as the ultrasonic energy is imparted through the horn, the at least one protruding distal portion having a length longer than a thickness of the first part, wherein a collapse distance of a weld formed at the interface portion is less than the thickness of the first part, to avoid read-through effects on the exposed surface of the second part.

The one or more controllers can be further configured to cause the horn to be moved via the servo-driven actuator toward the second part at a rate of at least 12 millimeters per second. The ultrasonic energy can have an amplitude of at least 50 micrometers peak-to-peak, and the frequency can be 50 kHz. The second part can have a thickness that does not exceed 2.6 millimeters, and the exposed surface can be painted. The length of the distal portion cab be 20% longer than the thickness of the first part. The one or more controllers can be further configured to cause the horn to be retracted using the servo-driven actuator from the first part before the at least one protruding distal portion fully penetrates through the thickness of the first part and ceasing application of the ultrasonic energy. The at least one protruding distal portion cam be a plurality of protruding distal portions, each having the same length. The at least one protruding distal portion can have, at an end thereof, a square cross-section, or a round cross-section, or an annular cross-section.

DETAILED DESCRIPTION

Figure 1:
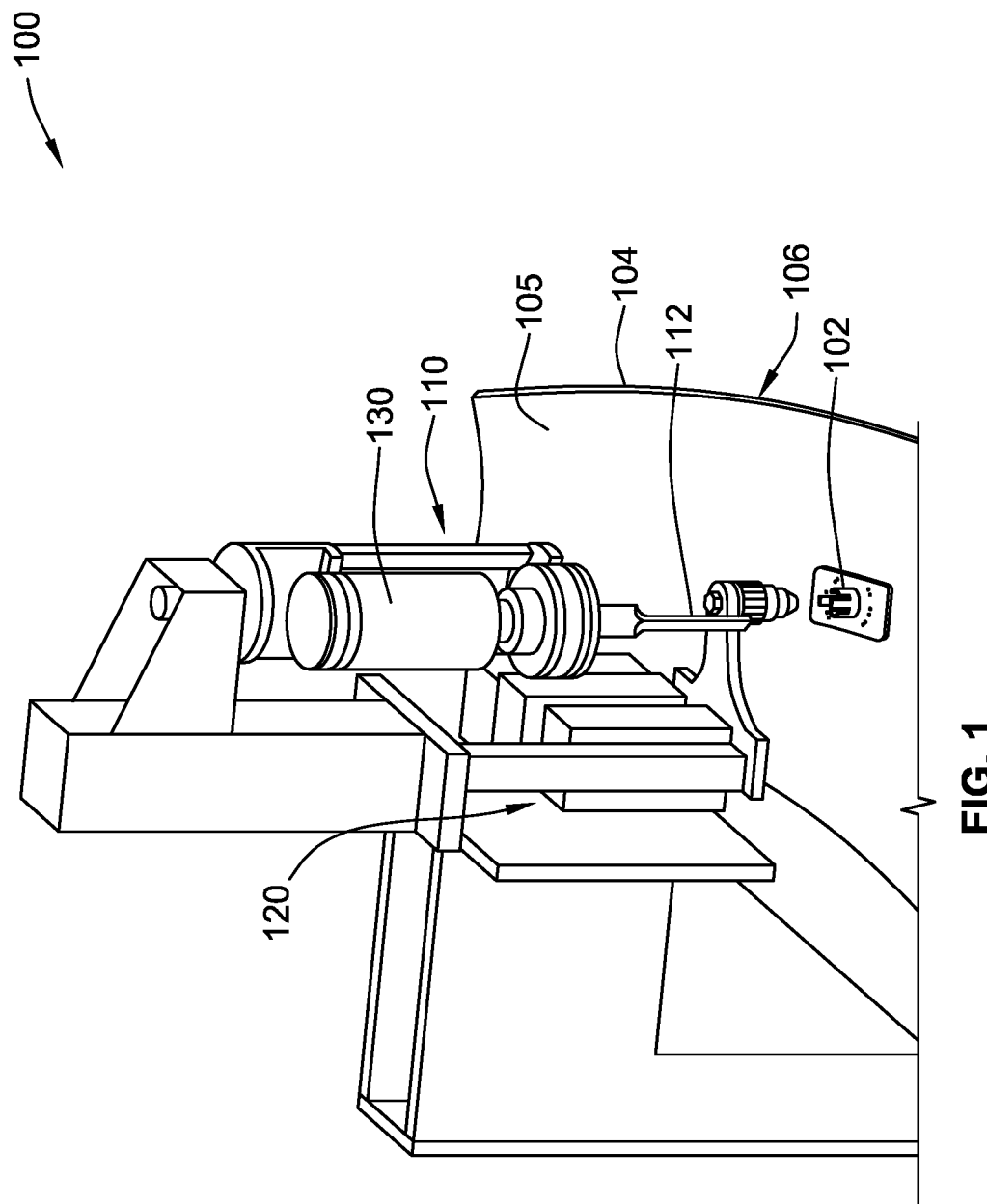
FIG. 1 is an ultrasonic welding system for joining a thermoplastic part to a thin thermoplastic part without causing visible read-through on the other side of the thin part.

FIG. 1 is an ultrasonic welding system 100 for joining a first thermoplastic part 102 and a thin, second thermoplastic part 104 without causing visible read-through on an exposed surface 106 (opposite the surface-to-be-welded 105) of the second part 104. The system 100 includes an ultrasonic welding stack 110 including a horn 112 arranged to press the first part 102 to be joined with the inner surface 105 of the second part 104. The inner surface 105 is opposite the exposed surface 106, which can have a smooth, polished surface, such as one painted with a high gloss finish. For ease of discussion purposes only and without limiting the applications to which the present disclosure pertains, to which there are many, suppose the second part 104 is a bumper for an automobile. The exposed surface 106 is painted to a high-gloss finish and will be installed to a car in a very visible and prominent place on the car. Any read-through caused by welding parts, such as the first part 102 (e.g., a bracket for a PDC (Parking Distance Controller) sensor or imaging camera), to the inner surface 105 of the second part 104 (e.g., bumper) would be readily perceived by the naked eye. As will be discussed in more detail herein, the inventors have discovered solutions to this read-through problem without having to completely reconfigure the pieces of the ultrasonic welding system 100.

Figure 2:
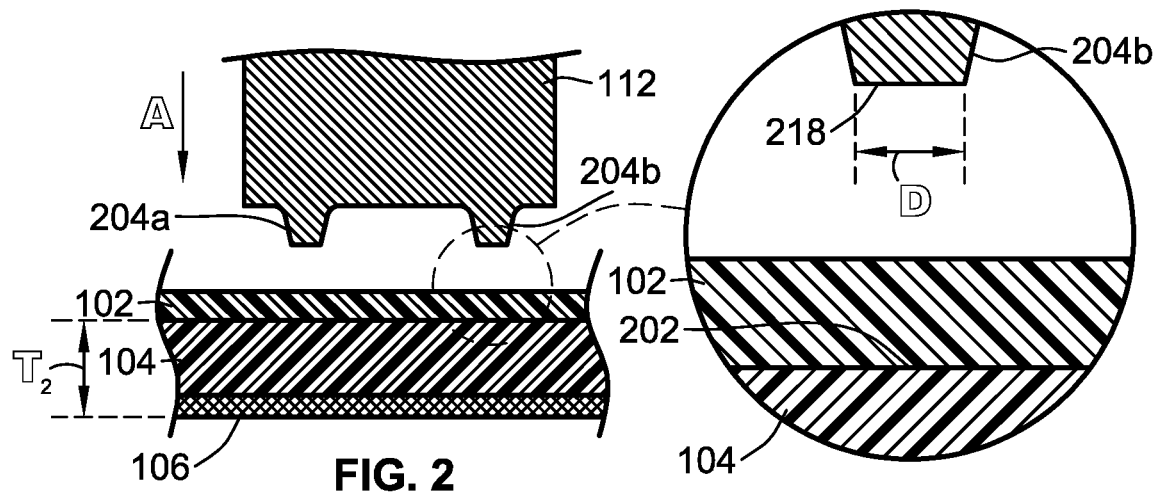
FIG. 2 is a cross-sectional view of a portion of the first and second parts and a horn having two distal portions advancing toward the first part.
Figure 3:
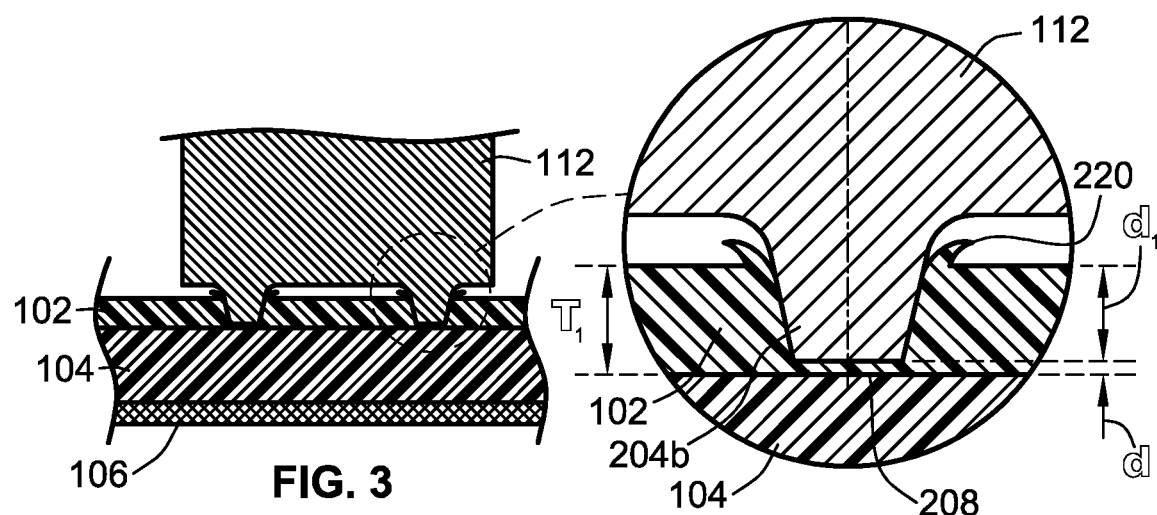
FIG. 3 is a cross-sectional view showing further advancement of the distal portions shown in FIG. 1 until a collapse distance has been reached before fully penetrating the first part.
Figure 4:
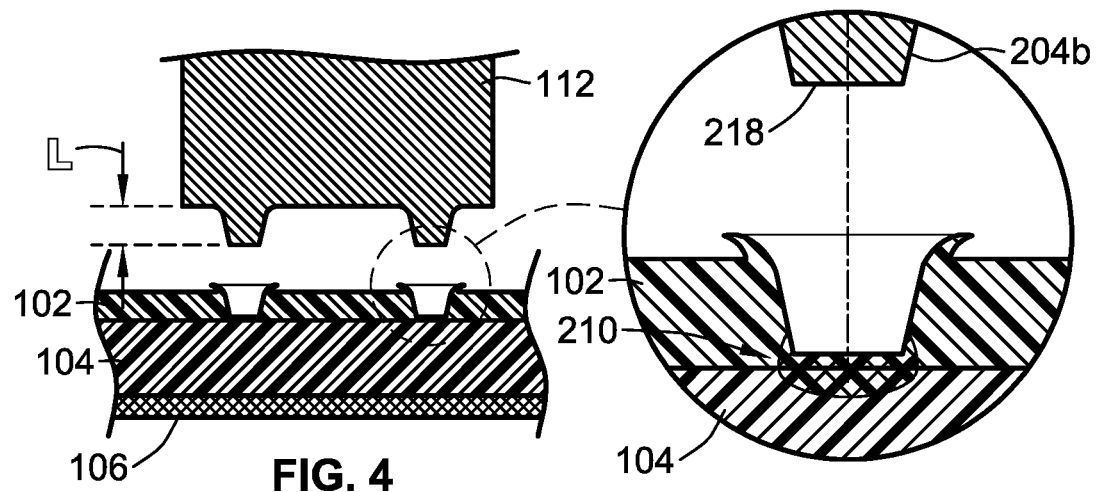
FIG. 4 is a cross-sectional view showing the horn shown in FIG. 3 full retracted from the first part, leaving behind a strong weld joint that produces no read-through on the other side of the thin part.

The horn 112, which can be seen in better detail in FIGS. 2-4, includes at least one protruding distal portion 204a (a second portion 204b is also shown, although one or more than two such portions can be present in alternative implementations). The distal portions 204a,b can also be called pins and have a pin-like form, albeit with optionally a slight taper (e.g., 20° or 25°) toward a base of the pin where it is integral with the rest of the horn 112. An interface portion 202 exists between the first part 102 and the second part 104 when they are brought together to be joined.

The ultrasonic welding system 100 includes one or more controllers 120 (see FIG. 1) operatively coupled to the ultrasonic welding stack 100. The one or more controllers can be microelectronic controllers or processors, and can be controlled by any combination of software, firmware, or both to control the ultrasonic welding stack 100, including its movement and the ultrasonic energy that is applied through the horn 112.

The ultrasonic welding system 100 includes a servo-driven actuator 130, such as a servo motor, which is coupled to the horn 112 to advance and retract the horn 112 under control of the one or more controllers 120. While some of the basic components of an ultrasonic welding system are disclosed herein, the skilled person familiar with ultrasonic welding systems will readily recognize common components and configurations of an ultrasonic welding system, which are too numerous to mention here. A key finding by the inventors to completely eliminate the read-through phenomenon involves the configuration of the stack in relation to various parts and their form factors, so it should be understood that components such as power supplies, wiring harnesses, frames, and other cooperating components in various ultrasonic welding systems depending on the myriad applications thereof are not described herein for the sake of brevity and to focus the reader on salient aspects of the inventions.

Reference will now be made to FIGS. 2-4, using specific dimensions and figures that are not intended to limit the scope of this disclosure. It should be emphasized that certain principles have been discovered to eliminate read-through, but it is convenient to discuss one example of a configuration as a framework to explain the broader concepts of the inventions. To that end, the following data in Table 1 below was used in the setup shown and described in connection with FIGS. 2-4.

TABLE 1

| Element | Value (exemplary) |
| --- | --- |
| Thickness of first part 102 (T1) | 0.95-1 mm |
| Thickness of second part 104 (T2) | 2.2-2.6 mm |
| Diameter or width of distal portion 204a, b (D) | 1 mm |

TABLE 1-continued

| Element | Value (exemplary) |
| --- | --- |
| Length of distal portion (pin) 204a, b (L) | 1.2 mm |
| Maximum collapse distance (d1) | 0.8-0.9 mm |
| Frequency, f, of ultrasonic energy applied to horn 112 | 50 kHz |
| Movement speed, v, of stack 110 | 12 mm/second |
| Amplitude peak-to-peak, A, of ultrasonic energy | 50 μm |

As emphasized above, these values are merely exemplary, and the inventors have discovered that a significant range of other possible configurations avoid read-through. Generally speaking in colloquial terms, it is desirable to use a relatively high frequency, move the stack at a generally high speed at a generally high amplitude to avoid read-through on a thin part. A consideration is the frequency of the applied ultrasonic energy. It has been found that, for example, a frequency of 35 kHz applied to a part that is to be joined to a thin part having a thickness less than or equal to 2.6 mm or 2.8 mm, causes read-through. When a frequency in the range of 45-70 kHz is applied, no read-through is observed. Those skilled in the art will appreciate that 45 kHz is not a precise floor, nor is 70 kHz a precise ceiling, and that slight deviations (e.g., up to ±15%) away from these values can still avoid read-through. Another consideration is the speed of the stack 110. Stack 110 advancing speeds between 10-12 mm/s produce excellent quality welds with no read-through, when combined with a relatively high frequency (e.g., above 45 kHz). The stack 110 should be retracted rapidly as soon as the collapse distance has been reached to immediately withdraw further application of ultrasonic energy to the interface portion 202 to stop further melting from penetrating into the thickness T2 of the second part 104. Servo-driven actuators 130 are particularly well-suited for tightly controlled and repeatedly consistent speed and distance movements of the stack 112. However, any other suitable movement-imparting mechanisms in which speed and distance can be consistently and repeatedly controlled can be used instead of a servo-driven actuator 130. Although the interface portion 202 is shown to be relatively flat, when the second part 104 is, e.g., a car bumper, the second part 104 will be curved, so the interface portion 202 may have a small airgap between the first and second parts 102, 104.

Yet another consideration is the amplitude of the ultrasonic energy. Amplitude of about 50 μm p-p, in combination with a relatively high frequency also produces excellent quality welds with no read-through. Another consideration is the collapse distance. The collapse distances should not exceed the thickness, T1, of the first part 102. Ideally, it is within 80% of the thickness, so if T1 is 1 mm, then the collapse distance should not exceed 0.8 mm or even 0.9 mm. The distal portion 204a,b or pin of the horn 112 should not penetrate all the way through the thickness T1 of the first part 102. Localized melting of the thermoplastic with contributions from both the first and second parts occurs at the tip or end 218 of the distal portion 204a,b of the horn 112 to form a spot weld thereat, so to avoid read-through, the inventors discovered that the horn 112 should stop advancing before it penetrates fully through the thickness T1 of the first part 102. As the material at the interface 202 is melted, the molten material pushes between the two parts 102, 104 at the interface 202, forming a strong joint or weld without causing read-through on the opposite surface 106 of the second part 104.

Referring back to FIGS. 2-4, in FIG. 2, the horn 112 is advanced in a direction along arrow A toward the first part 102 by the servo-driven actuator 130 at a speed, such as 10 mm/s or 12 mm/s. The distal portions 204a,b make contact with the first part 102, and the ultrasonic energy applied through the horn 112 becomes focused through the distal portions 204a,b and begin to melt the first part 102. The horn 112 is advanced until, as can be seen in FIG. 3, a collapse distance is reached, at which time the advancement of the horn 112 is stopped. Here, the distal portions 204a,b do not fully penetrate through the thickness T1 of the first part 102. Melting of the first part occurs and forms melted portions 220 on the top surface of the first part 102. At the interface 202 between the first and second parts 102, 104, localized melting at the tip or end 218 of the distal portion 204a,b also occurs with contributions from both the first and second parts 102, 104, which can be seen in FIG. 4. A strong weld joint is created at this localized area 210 without causing melting to penetrate through the thickness T2 of the second part 104, thereby avoiding read-through on the exposed surface 106 of the second part 104. The length, L, seen in FIG. 4, of the distal portions 204a,b is about 10% to 20% longer than the thickness, T1, of the first part 102, but does not fully penetrate the thickness T1 of the first part 102.

Figure 5A:
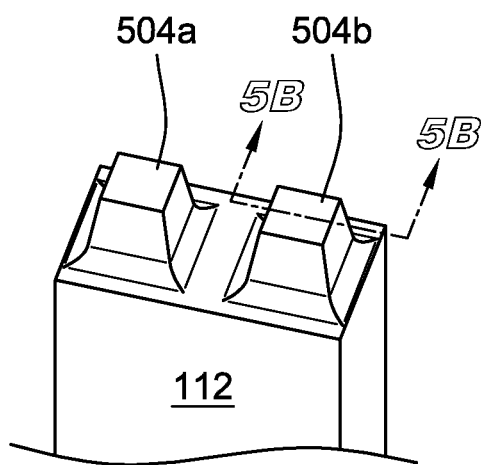
FIGS. 5A, 5B, 6A, 6B, 7A, and 7B illustrate different example form factors for the distal portions of the horn.
Figure 5B:
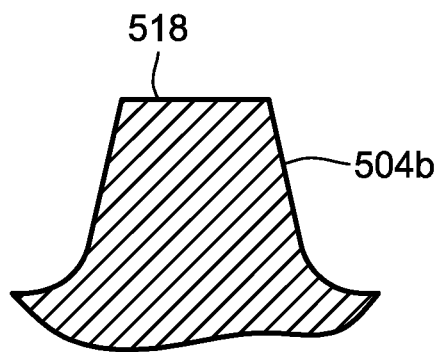

FIGS. 5A, 5B, 6A, 6B, 7A, and 7B illustrate different form factors for the distal portions of the horn 112. The distal portions 204a,b shown in FIGS. 2-4 can have any of the form factors shown in FIGS. 5A-7B. Other form factors are contemplated depending on the application, but read-through effects have been noted to be avoided using these shapes. For example, in FIG. 5A, the distal portions 504a, 504b have a square shape or cross-section at an end 518 thereof (see FIG. 5B). These are shown close together for ease of illustration, but the distal portions 504a,b can be spaced at any constant or varied distance according to any pattern depending on the part to be welded. The distal portions can have a taper along its length as can be seen in FIG. 5B.

Figure 6A:
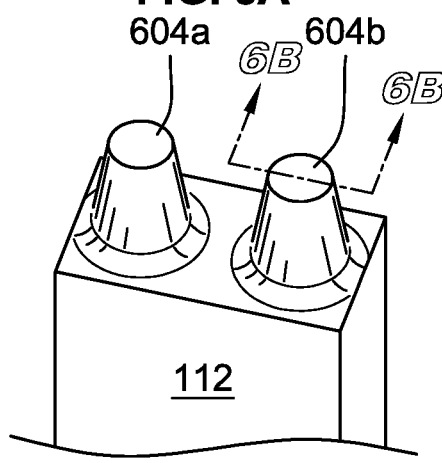
Figure 6B:
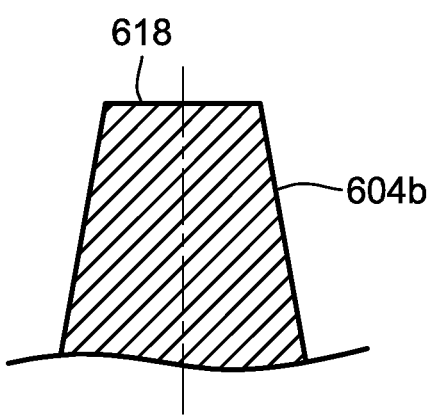
Figure 7A:
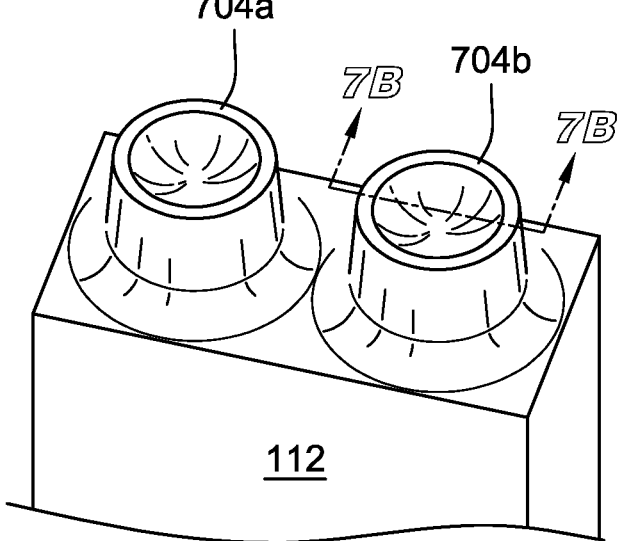
Figure 7B:
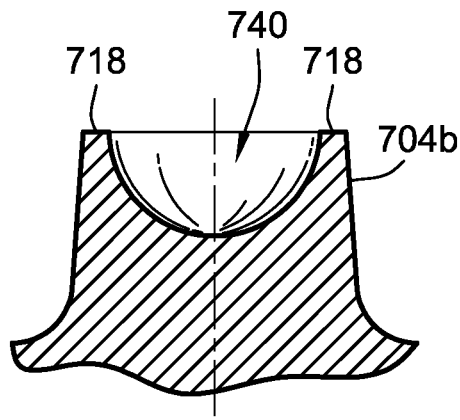

In FIG. 6A, the distal portions 604a,b have a round shape or cross-section at an end 618 thereof (see FIG. 6B). In FIG. 7A, the distal portions 704a,b have an annular shape or cross-section at end 718 (FIG. 7B) thereof. A recess 740 forms the annular shape and allows molten material from the first part to melt within the recess 740 as the horn 112 is advanced through the thickness of the first part. The thickness of the annular portion of the horn 112 can be 0.25 mm, the inner diameter of the annular portion can be 2 mm, and a height of the recess 740 can be 0.5 mm. The distal portions 704a,b can have a slight taper, e.g., 8°.

Figure 8:
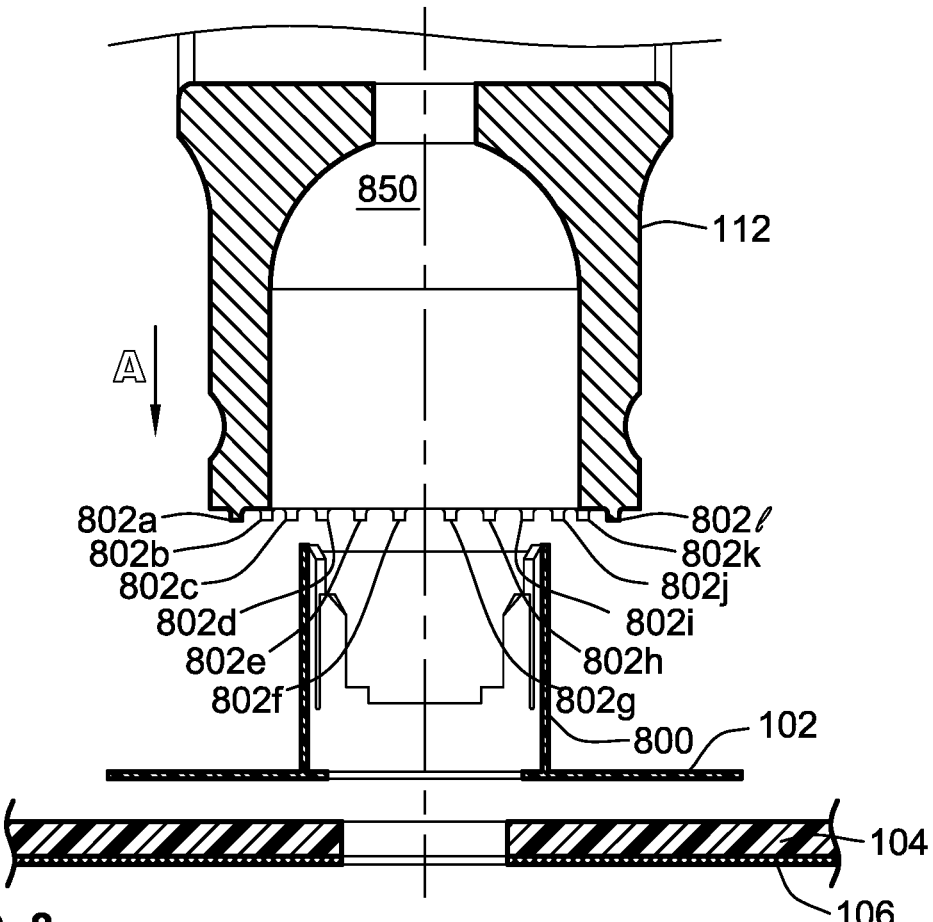
FIG. 8 illustrates an example where a park distance control (PDC) sensor to be welded to a bumper for an automobile.
Figure 9:
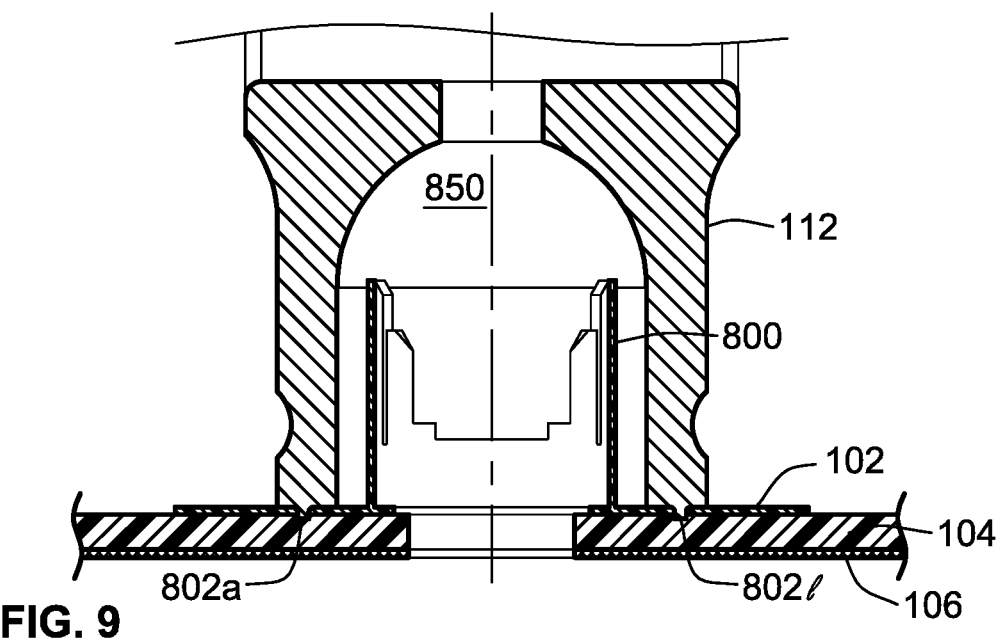
FIG. 9 shows the horn shown in FIG. 8 fully extended until the desired collapse distance has been reached.

FIG. 8 illustrates an example where the first part 800 is a park distance control (PDC) sensor to be welded to a second part 104, which in this example can be a bumper for an automobile. The horn 112 has multiple distal portions 802a,b,c,d,e,f,g,h,i,j,k,l arranged about a periphery of a cavity 850 of the horn 112. The cavity 850 receives a bracket portion of the PDC sensor 800 so that the distal portions 802a-1 can be simultaneously moved through the first part 102 to create multiple weld joints simultaneously relative to the second part 104 without causing any read-through on the exposed surface 106 of the second part 104. FIG. 9 shows the horn 112 fully extended until the desired collapse distance has been reached, which as described above does not exceed the thickness of the portion of the first part 104 that is welded to respective portion of the second part 102.

Figure 10:
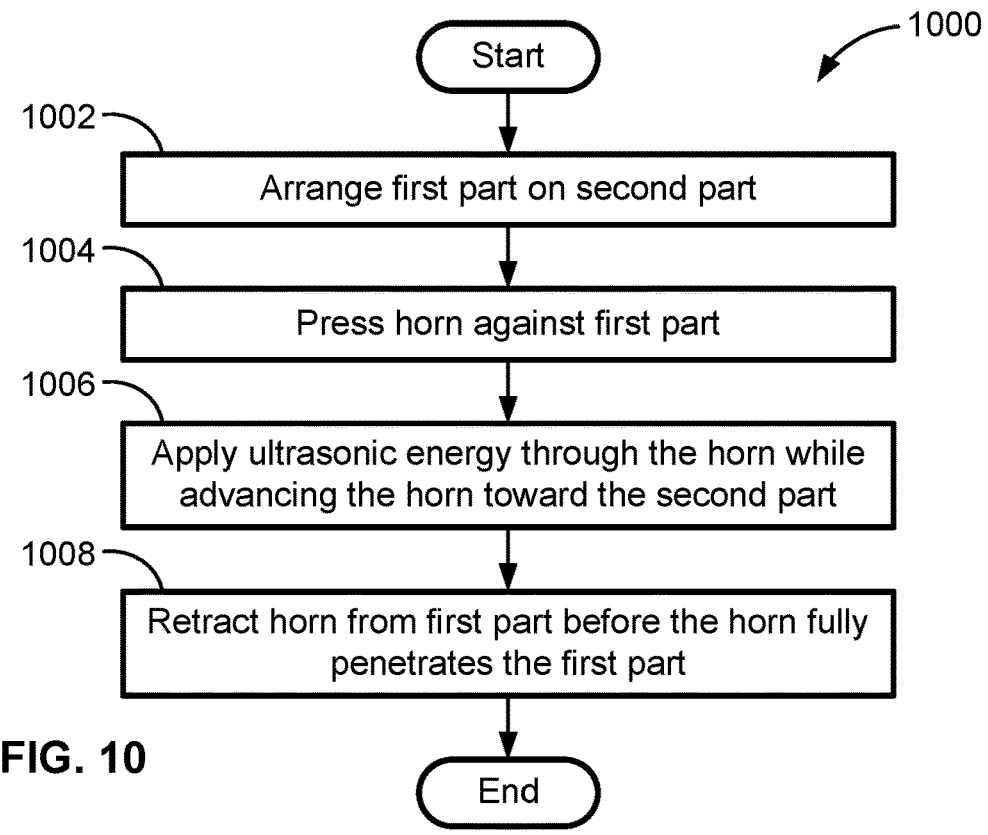
FIG. 10 is an example flow chart illustrating an ultrasonic welding method for joining two thermoplastic parts together without causing visible read-through on an exposed surface of the second part.

FIG. 10 is an example flow chart illustrating an ultrasonic welding method 1000 for joining two thermoplastic parts together without causing visible read-through on an exposed surface of the second part. The method 1000 includes arranging the first part (e.g., 102) on the second, thin part (e.g., 104) (1002). The horn (e.g., 112) is pressed against the first part (1004). Ultrasonic energy is applied through the horn while advancing the horn toward the second part (1006). During this step, the distal portion of the horn advances through the first part until it is stopped before the horn fully penetrates the first part. The horn is retracted from the first part before the horn fully penetrates the first part (1008). Stated differently, the collapse distance of distal portion is less than a thickness of the first part.

Figure 11:
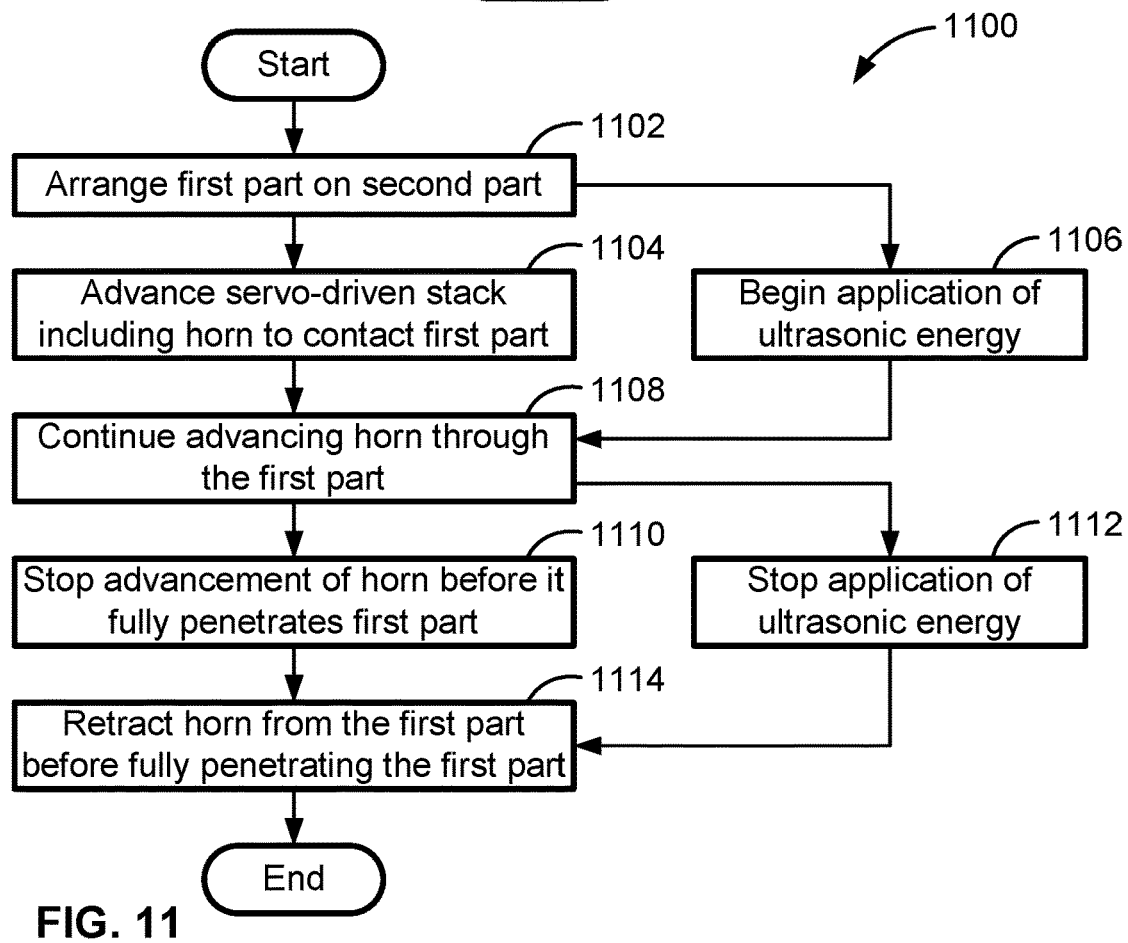
FIG. 11 is an example flow chart illustrating an ultrasonic welding method for joining two thermoplastic parts together without causing visible read-through on an exposed surface of the second part.

FIG. 11 is an example flow chart illustrating an ultrasonic welding method 1100 for joining two thermoplastic parts together without causing visible read-through on an exposed surface of the second part (which is opposite the surface of the second part onto which the first part is to be joined). The method 1100 includes arranging the first part (e.g., 102) on the second part (e.g., 104) (1102). The servo-driven stack (e.g., 110) is advanced including the horn (e.g., 112) to contact the first part (1104). The ultrasonic energy (e.g., 50 kHz at 50 μm) is applied through the horn (1106). The horn continues to advance through the first part (1108) before it fully penetrates through the thickness of the first part. The advancement of the horn is stopped before the horn fully penetrates the first part (1110). Application of the ultrasonic energy is stopped (1112). The horn is retracted from the first part before fully penetrating the first part, leaving a strong weld joint between the two parts without any read-through on the other exposed surface of the second part.

While the parts here have been shown in the drawings as having a generally flat interface, they can have non-flat interfaces, such as curved, wavy, or the like. In fact, when the first part is a PDC sensor bracket and the second part is a bumper, the bumper is curved, so the PDC sensor bracket, which has a flat surface, needs to be welded to a gently curved surface at multiple points around the bracket flange. The horn can have any number of pins or distal portions that penetrate into the first part, and they can be arranged according to any pattern suitable for the part to be welded.

What is claimed is:

1. A device formed by an ultrasonic welding process, the device comprising:
    a first part including an interface portion; and
    a second part having an inner surface and an opposing exposed surface, the inner surface of the second part contacting the interface portion of the first part,
    the second part being coupled to the first part via one or more weld joints formed at the interface portion by ultrasonic energy provided via a horn having at least one protruding distal portion configured to penetrate through the first part as the ultrasonic energy is imparted through the horn, the horn having a length longer than a thickness of the first part, wherein a collapse distance of each of the one or more weld joints is less than the thickness of the first part, thereby avoiding visible read-through effects from the ultrasonic welding process on the exposed surface of the second part.

2. The device of claim 1, wherein the second part is a bumper for an automobile.

3. The device of claim 2, wherein the first part is a park distance control (PDC) sensor.

4. The device of claim 1, wherein the collapse distance of the weld joint is between about 0.8 mm and about 0.9 mm.

5. The device of claim 1, wherein the thickness of the first part is between about 0.95 mm and about 1 mm.

6. The device of claim 1, wherein a thickness of the second part is greater than the thickness of the first part.

7. The device of claim 6, wherein a thickness of the second part is between about 2.2 mm and about 2.6 mm.

8. The device of claim 1, wherein the second part comprises a thermoplastic material.

9. The device of claim 1, wherein the one or more weld joints includes a plurality of weld joints.

10. The device of claim 1, wherein the interface of the first part is generally flat.

11. The device of claim 9, wherein the inner surface of the second part is curved.

12. The device of claim 1, wherein the ultrasonic energy oscillates at a frequency in a range of 45-70 kHz through the horn.

\* \* \* \* \*